May 26, 1925.
W. C. WRIGHT
COMBINED QUICK RELEASE AND CHECK VALVE FOR AIR BRAKES
Filed July 1, 1924
1,539,228
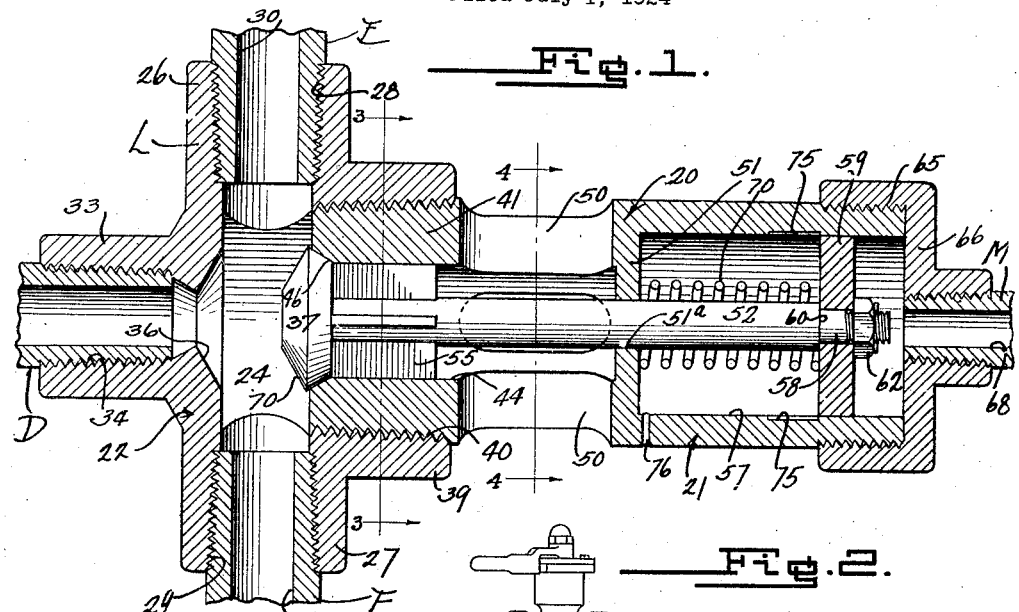
Fig. 1.
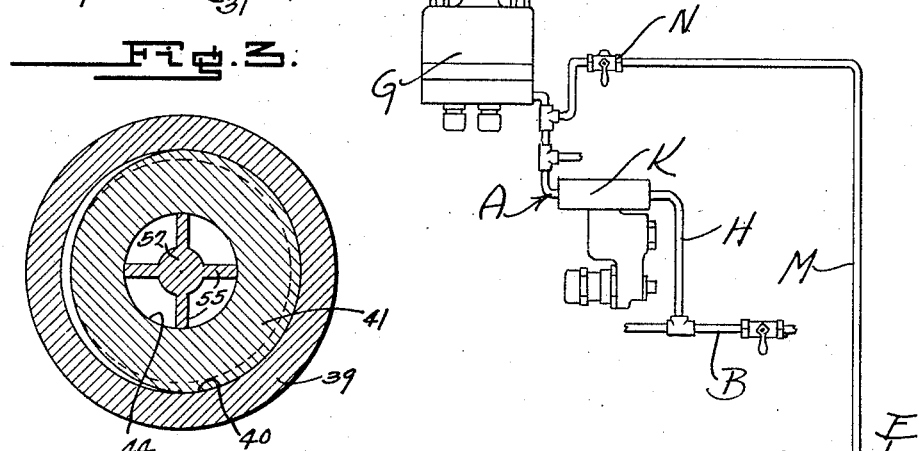
Fig. 2.
Fig. 3.
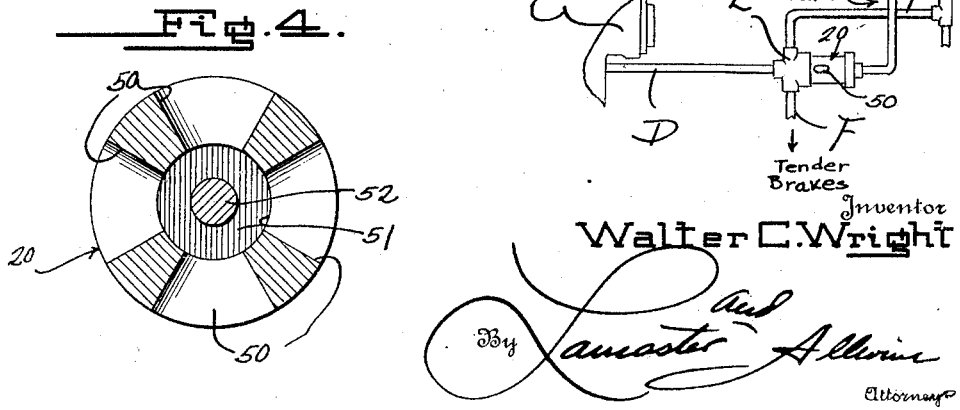
Fig. 4.
Inventor
Walter C. Wright
By Lancaster and Allwine
Attorneys Patented May 26, 1925.

1,539,228

UNITED STATES PATENT OFFICE.

WALTER C. WRIGHT, OF YOUNGSTOWN, OHIO.

COMBINED QUICK-RELEASE AND CHECK VALVE FOR AIR BRAKES.

Application filed July 1, 1924. Serial No. 723,609.

*To all whom it may concern:*

Be it known that I, WALTER C. WRIGHT, a citizen of the United States, residing at Youngstown, in the county of Mahoning and State of Ohio, have invented certain new and useful Improvements in a Combined Quick-Release and Check Valve for Air Brakes, of which the following is a specification.

This invention relates to improvements in means for releasing air brakes.

The primary object of this invention is the provision of a combined release and check valve arrangement, of a relatively simple character, readily operable to shut off an air supply to the brake line, and open the brake cylinder line to the atmosphere for releasing a brake application.

A further object of this invention is the provision of a relatively simple combined release and check valve for releasing locomotive and tender air brakes, which may be readily installed upon all conventional air brake systems, with minor alterations such as will be apparent to anyone skilled in the art to which the invention relates.

A further object of this invention is the provision of a combined release and check valve device of the above mentioned character, which is preferably intended for emergency use only; which may be associated with conventional air brake systems; and which will work properly and permit of release of brake applications in conventional manner. However, on account of defective appliances the locomotive brakes and tender brakes do not release promptly at all times, and sometimes not at all, and it is an important object of this invention that the quick release and check valve structure may be used to promptly close off air supply to the brake cylinders and to release air pressure from the brake cylinders for releasing brake applications.

Other objects and advantages of this invention will be apparent during the course of the following detailed description.

In the drawing wherein similar reference characters designate corresponding parts throughout the several views.

Figure 1 is a cross sectional view taken through the improved combined release and check valve structure, showing the related details thereof, and the means of connecting the same to conventional features of an air brake system.

Figure 2 is a diagrammatic representation of one arrangement which the improved valve structure may assume with conventional features of a well known air brake system.

Figures 3 and 4 are cross sectional views taken on their respective lines in Figure 1 of the drawing.

In the drawing, wherein for the purpose of illustration is shown only a preferred embodiment of the invention, the letter A may generally designate any approved type of air brake system, which may include a line B leading from a main reservoir (not shown). A distributing valve C, or the like, may be connected as a part of the system, receiving air from the line B and for controlling flow of the same into the air supply line D which may be connected with the driver brake cylinder line E and tender brake cylinder line F. An independent brake valve G may be provided as a part of the system, having connection with the main reservoir line B through a line H wherein a reducing valve K of the well known type may be provided. The improved quick release and check valve device L may be placed in connection with the lines D, E and F, as will be subsequently described, and having a line M leading therefrom for connection to the independent brake line H between the reducing valve K and the independent brake valve G; this line M having a three way cock N therein by which pressure from the line H may be passed through the line M for operating the valve details of the quick release and check valve structure L, or by means of which the air pressure in the line M between the three way cock N and valve structure L may be released to the atmosphere, as will be subsequently described.

Referring to the details of construction of the improved valve structure L, the same includes a housing 20, consisting of a substantially cylindrical shaped body portion 21, and a coupling portion 22 detachably connected therewith.

The coupling portion 22 is preferably of one piece construction, providing a compartment 24 therein, having the oppositely disposed tubular extensions 26 and 27 integrally connected to that portion of the section 22 in which the compartment 24 is formed, and which extensions 26 and 27 are preferably provided with internally screw threaded openings 28 and 29 respectively, adapted to detachably receive the pipe sections E and F above mentioned, to communicate the passageways 30 and 31 of said pipe sections E and F respectively with the compartment 24. An extension 33, preferably of the same size as the extensions 26 and 27, is formed with the section 22, on an axis at right angles to the oppositely disposed extensions 26 and 27, and providing an internally screw threaded passageway 34 therein which communicates with the compartment 24, and which detachably receives the air supply line D therein. At the juncture of the extension 33 with that portion of the section 22 in which the compartment 24 is formed, a valve seat 36 is provided, which is tapered, and the surface of which diverges from the passageway 34 toward the compartment 24, and upon which the improved control valve 37 is adapted to seat, as will be subsequently described.

Diametrically opposed to the extension 33, at the opposite side of the compartment 24, a tubular extension 39 is formed integral with the section 22 of the housing 20, providing an internally screw threaded opening 40 therein adapted to detachably receive the upper externally screw threaded end 41 of the body section 21, to communicate the passageway 44 in the body section 20 with the compartment 24. At the upper end of the passageway 44, in facing relation with the compartment 24, a tapered valve seat 46 is preferably provided, at a taper which diverges toward the compartment 24 away from the passageway 44, and upon which the valve 37 is adapted to normally seat at the opposite side of the compartment 24 from the valve seat 36, which is also provided for said valve 37.

Air is supplied to the compartment 24 from the air supply line D, and the air pressure therefrom is transmitted through the brake lines to the various brake cylinders which communicate with the compartment 24, and it is readily understood that the valve 37 will be normally maintained closed, so that air pressure cannot escape from the compartment 24 and the air lines, through the passageway 44.

Referring to the specific structure of the body section 21 of the housing 20, the body section 21 is of elongated substantially cylindrical construction, and outwardly of the outer edge of the extension 39 this body section 21 is provided with transverse relatively large escape ports 50 which communicate the passageway 44 with the atmosphere. At the opposite side of these ports 50 from the valve seat 46, an annular bearing flange 51 is provided, having an opening 51ª therein through which a valve rod 52 is slidably disposed; the valve rod 52 on the compartment facing end thereof having the valve 37 rigidly connected thereto. In order to properly guide movement of the valve rod and valve, it is preferred to provide radially extending guide webs or flanges 55, connected with the head 37 and the stem 52, for sliding in the passageway 44 between the ports 50 and the valve seat 46. The valve stem 52, of course, has a snug sliding fit in the passageway 51ª of the annular guide flange or bearing 51. On the opposite side of the bearing flange 51 from the ports 50, a compartment 57 is provided, and in this compartment the lower reduced end 58 of the valve stem 52 is provided with a piston 59, which slides or reciprocates in this compartment 57. The piston 59 is maintained in abutting relation with the shoulder 60 on the stem, at the juncture of the reduced end 58 with the body portion of the stem 52, by a nut 62 which maintains the piston 59 rigid with the valve stem 52.

At the outer end of the body section 21, the same is externally screw threaded, at 65, for detachably receiving a coupling cap 66, by which the pressure line M is connected so that the passageway 68 thereof is in communicating relation with the compartment 57 behind the piston 59. A compressed expansion spring 70 is preferably provided, engaging the bearing flange 51 at one end and the valve piston 59 at the opposite end and normally expanding to maintain the valve 37 seated on the seat 46 to close off communication of the compartment 24 with the atmospherically communicating ports 50.

Referring to the operation of the quick release and check valve structure in the specific embodiment in which it is illustrated in the drawing, to release a brake application it is merely necessary to operate the three way cock N, which it might be mentioned is placed in the driver's cab adjacent the independent brake valve G, and this feeds reduced air pressure, say of 45 pounds, through the line M to the compartment 57 on the opposite side of the piston 59 from the compression spring 70. The air pressure in the line D, and in the engine brake and tender brake lines E and F amounts to considerably more than the reduced air pressure in the line M, but notwithstanding this fact the application of the reduced air pressure to the piston 59 will move the same in its compartment 57 to unseat the valve 37 from the valve seat 46 on which it is normally positioned. This unseating of the valve 37 is occasioned by reason of the greater surface of the piston 59 on which the reduced air pressure acts, than the surface area on the valve 37, against which air pressure from the supply line D and brake lines act. The reduced air pressure acting on the piston 59 will thus unseat the valve 37 and permit the air pressure in the driver brake and tender brake lines E and F to exhaust from the compartment 24 past the valve seat 46 and into the body section 21 of the housing 20 and escape to the atmosphere through the relatively large ports 50. The continued application of reduced air pressure against the piston 59 will cause the valve 37 to move onto its seat 36 at the opposite side of the compartment 24 from the seat 46, and close communication of the air pressure line D with the compartment 24 and the brake lines E and F. Leakage of air pressure from the supply line D is thus prevented, and the quick release of air pressure from the brake cylinders is permitted to release a brake application.

In order to buff the action of the valve 37 when the same is moving across the compartment 24 toward the valve seat 36, it is preferred to provide shallow by passes 75 in the internal walls of the compartment 57. As the reduced air pressure is fed into the compartment 57 behind the piston 59, the latter is moved along the compartment 57, and gradually exposes the outer ends of the by passes 75 to the reduced air pressure, so that the reduced air pressure escapes from the outer side of the piston 59 into the compartment 57 between the piston 59 and the annular bearing flange 51, momentarily building up the pressure in this space between the piston 59 and bearing flange 51 until the piston passes said by passes 75. This buffs the action which the reduced air pressure has upon the moving parts of the valve mechanism, and the valve may then seat lightly on seat 36, and the air pressure at the inner side of piston 59 escapes through port 76. The spring 70, of course, tends to buff the action of the air pressure in its unseating of the valve 37, although the spring 70 is normally provided in order to maintain the valve 37 seated on the seat 46. Air in the compartment 57 between the piston 59 and the bearing flange 51 may escape by way of a small exhaust port 76, in order that atmospheric pressure may exist in the compartment 57 when the valve 37 is in seated position.

As used in the air brake system A the improved quick release and check valve structure L is operated as above described for releasing air pressure from the brake lines E and F, to release the driver and tender brakes. Ordinarily, the distributing valve C in the system A is used to release brake applications, but in cases of emergency the improved valve L may be called into play.

In various other conventional types of brake systems, minor conduit alterations may be necessary in order to adapt the quick release and check valve structure L therefor. Thus, in the well known case of a double check valve in an air brake system having two brake pipe connections, the brake pipes may be united near the double check valve and connected with the improved release and check valve structure L so that the air supply may be cut off, as well as brake pipe pressure released when desired. Similar expedients may be used on tender brake equipment which is separate from the engine brake equipment, and the improved release and check valve structure may be used upon the brake cylinders directly, if so desired.

Various changes in the shape, size, and alteration of parts may be made to the form of the invention herein shown and described, without departing from the spirit of the same or the scope of the claims.

I claim:

1. In a quick release construction for air brake systems the combination with a brake cylinder, an air pressure supply arrangement for the brake cylinder, and means for regulating the flow of air from said air pressure supply arrangement to the brake cylinders, a quick release valve having connection with the brake cylinder, and reduced pressure means for operating the quick release valve to close the air pressure supply arrangement to the brake cylinder and open the latter to the atmosphere to allow pressure to escape therefrom.

2. In a quick release construction for air brake systems the combination with an air brake cylinder connecting line, an air pressure supply line, a distributing valve from which the air pressure supply line leads, a quick release and check valve structure having connection with the brake cylinder connecting line and supply line, and means for operating the quick release and check valve to close the air pressure supply line and open the brake cylinder to the atmosphere to release pressure from the latter and release the brake application.

3. In a quick release structure for air brake systems the combination of a distributing valve, an air supply line leading from the distributing valve to an air brake line, a quick release and check valve structure connected between the air supply line and brake cylinder line, an independent brake valve, a main reservoir line leading to the independent brake valve including a reducing valve, a line leading from the main reservoir line between the reducing valve and independent brake valve to said quick release and check valve, and a three way cock in the last mentioned line for opening the line between said cock and the quick release valve to the atmosphere or for communicating said line with the release and check valve structure for conduction of reduced air pressure to the quick release and check valve whereby to operate the latter for closing the air pressure supply line and opening the brake cylinder line to the atmosphere for release of air pressure from the latter.

4. In a quick release and check valve structure for air brake systems a housing including a compartment therein having a laterally communicating passageway and valve seats at opposite sides of the compartment and at opposite sides of the passageway, said housing having a passageway leading off from one of said valve seats and having ports leading off therefrom to the atmosphere at the opposite side of the opposite valve seat, and valve means operable between said valve seats normally closed on one of said valve seats to close off communication of the compartment and passageways with said atmospherically communicating ports, and means to move said valve onto the other valve seat to close off communication of the second mentioned passageway with the other passageway and said compartment.

5. In a releasing and check valve structure of the class described a housing providing a compartment therein having oppositely disposed valve seats therein and a passageway leading off from one valve seat and an atmospherically communicating port at the opposite side of the other valve seat from said compartment and said housing including a passageway leading off from the compartment between said valve seat, a valve for said valve seat, means normally maintaining the valve seated on one of said seats to close off communication of the atmospherically communicating port with said compartment and said passageways, and means to move said valve to the other valve seat to close off communication of the passageway on the opposite side of said last mentioned valve seat from the compartment and to open the passageway between said valve seats to said atmospherically communicating port.

6. In a valve structure of the class described a housing including a compartment with oppositely disposed passageways leading therefrom and oppositely disposed valve seats arranged on an axis at right angles to said above mentioned passageways, said housing having a passageway leading away and communicating with one of said seats and said housing at the opposite side of the other valve seat from said compartment having an atmospherically communicating port, a valve normally seated on the last mentioned seat, and air pressure means for unseating said valve from its normal position onto the other seat to close off communication of the passageway adjacent said seat from said compartment and whereby to communicate the oppositely disposed passageways with said atmospherically communicating port.

7. In a valve structure of the class described a housing providing a compartment therein, air brake line means providing a passageway communicating with said compartment, air supply line means including a passageway communicating with the compartment at one side of the last mentioned passageway, said housing including a valve seat at the juncture of the air supply line passageway with said compartment, said housing at the opposite side of said compartment from said first mentioned valve seat including a valve seat and an atmospherically communicated port at the opposite side of the last mentioned valve seat from said compartment, and a valve cooperating between said valve seats whereby to close off communication of the compartment with said air supply line passageway or with said atmospherically communicated port.

8. In a valve structure of the class described a housing providing a compartment therein, air brake line means providing a passageway communicating with said compartment, air supply line means including a passageway communicating with the compartment to one side of the last mentioned passageway, said housing including a valve seat at the juncture of the air supply line passageway with said compartment, said housing at the opposite side of said compartment from said first mentioned valve seat including a valve seat and an atmospherically communicated port at the opposite side of the last mentioned valve seat from said compartment, a valve cooperating between said valve seats whereby to close off communication of the compartment with said air supply line passageway or with said atmospherically communicated port, means at the opposite side of said atmospherically communicated port from said valve providing a compartment, a piston sliding in said compartment, means connecting the piston with said valve for movement therewith, spring means in the last mentioned compartment acting on the piston and against the housing to normally maintain the valve seated on its seat between the compartment and the atmospherically communicated port, and means for feeding air pressure on said piston whereby to unseat the valve against action of said spring and seat the same to close off communication of the air supply line passageway with said compartment first mentioned.

9. In a valve structure of the class described a housing providing a compartment therein, air brake line means providing a passageway communicating with said compartment, air supply line means including a passageway communicating with the compartment at one side of the last mentioned passageway, said housing including a valve seat at the juncture of the air supply line passageway with said compartment, said housing at the opposite side of said compartment from said first mentioned valve seat including a valve seat and an atmospherically communicated port at the opposite side of the last mentioned valve seat from said compartment, a valve cooperating between said valve seats whereby to close off communication of the compartment with said air supply line passageway or with said atmospherically communicated port, means at the opposite side of said atmospherically communicated port from said valve providing a compartment, a piston sliding in said compartment, means connecting the piston with said valve for movement therewith, spring means in the last mentioned compartment acting on the piston and against the housing to normally maintain the valve seated on its seat between the compartment and the atmospherically communicated port, and means for feeding air pressure on said piston whereby to unseat the valve against action of said spring and seat the same to close off communication of the air supply line passageway with said compartment first mentioned, said piston compartment having by passes therein whereby the air pressure acting on the piston may be transmitted to both sides of the piston after the piston has traveled a certain length to buff the movement of the valve in its passage from one valve seat to the other.

10. In a quick release valve and check valve structure of the class described a housing including air supply line and air brake line communicating means, a valve for regulating communicating of said means in said housing and for regulating communication of the air supply line with the atmosphere when the first two mentioned means are non-communicating, said housing including a compartment, a piston slidable in said compartment in connected relation with said valve, a spring under compression in said compartment normally acting on the piston to maintain the valve seated to close off communication of the air supply line means and air brake line means with the atmosphere, said compartment having a relatively small duct therein to permit slow exhaustion of air therefrom upon action of the piston in the compartment, means for feeding reduced air pressure on the piston to unseat the valve, and means for building up the pressure on the opposite side of the piston from the reduced air pressure side after the piston has traveled a predetermined distance.

11. In a valve structure of the class described a housing including a compartment having air supply and air brake line passageways communicating therewith, and having an atmospherically communicating port, valve seats, a valve operating on said valve seats whereby to either close the compartment from said atmospherically communicating port or whereby to close the air supply line passageway from said compartment, piston means connected for movement with the valve, means for feeding air pressure to the piston means, said piston means on which the air pressure acts having a surface of a greater area exposed to said air pressure than the surface of the valve which is exposed to said compartment when the atmospherically communicated port is closed from said compartment and whereby a less air pressure may act on the piston means to unseat the valve than is acting in said compartment to seat said valve.

12. In a device for quick release of brake applications in connection with air brake systems, the combination of an air brake cylinder, an air pressure supply arrangement, and means for permitting flow of air from said air pressure supply arrangement to the brake cylinder whereby to effect a brake application, a quick release valve structure connected with the brake cylinder, and means for operating said quick release valve structure to shut off the air supply to the brake cylinder and open the latter to the atmosphere to permit escape of air pressure from the brake cylinder and release the brake application.

WALTER C. WRIGHT.